Patented Apr. 19, 1932

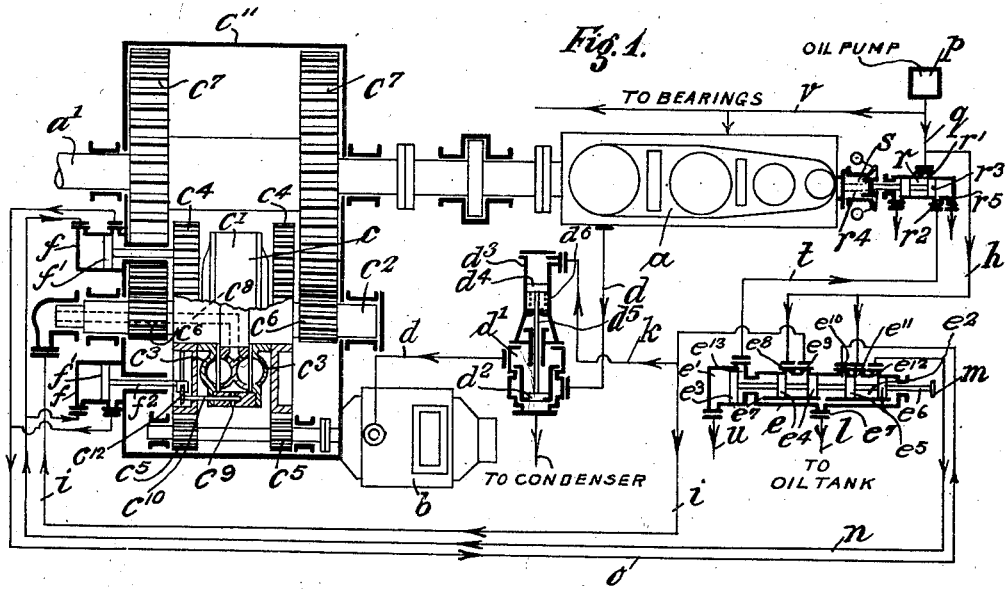

1,854,817

UNITED STATES PATENT OFFICE

HANS WACH, OF WESERMUNDE-LEHE, GERMANY

RECIPROCATING ENGINE AND TURBINE

Application filed July 16, 1926, Serial No. 122,790, and in Germany March 19, 1926.

This invention relates to power plants consisting essentially of a pair of engines, and has for its general object to provide a novel and practical control apparatus designed to enable both engines to deliver power simultaneously to a shaft for rotating same in one direction, or to enable power to be delivered by one of said engines to said shaft for rotating same in a reverse direction.

In particular, the invention relates to a ship propulsion power plant consisting essentially of a reversible reciprocating steam engine directly connected with a propeller shaft for rotating same in either "ahead" or "astern" directions, and a steam turbine deriving its power from the exhaust of the reciprocating engine and adapted to act in conjunction with the latter engine to impart rotation to the propeller shaft in an "ahead" direction.

According to the invention there is interposed between the turbine engine and the propeller shaft a fluid coupling device to which fluid is adapted to be supplied to couple the turbine engine with said shaft and from which fluid is adapted to be exhausted to disconnect the turbine from said shaft; a valve is provided to direct or to divert exhaust steam from the reciprocating engine to and from the turbine; fluid pressure devices are provided for actuating said valve and to open and close a port through which fluid is exhausted from the fluid coupling; a pump is provided for the supply of fluid pressure, and fluid control valves are provided for properly directing the flow of fluid to actuate the steam valve and to effect supply and exhaust of fluid to and from the fluid coupling.

In connection with the foregoing arrangement a particular object of the invention is to provide means whereby the steam valve is actuated to direct steam to the turbine only after connection of the turbine with the propeller shaft has been effected by means of the fluid coupling, and to divert steam from the turbine only after disconnection of the turbine from the propeller shaft has been effected, whereby "racing" of the turbine is avoided.

Another important object of the invention is to provide means operating automatically when the reciprocating engine is reversed to an "astern" direction to operate the steam valve to divert steam from the turbine and to effect exhaust of fluid from the fluid coupling.

With the foregoing and other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Fig. 1 is a diagrammatic illustration of a power plant embodying the features of the invention and showing the parts in "ahead" driving relation; and Fig. 2 is a view similar to Fig. 1 showing the parts in "astern" driving relation.

Referring to the drawings in detail, $a$ designates a reciprocating steam engine directly connected with a propeller shaft $a'$, $b$ designates a steam turbine releasably connected with the propeller shaft by means of a fluid coupling device designated generally as $c$, $d$ designates a conduit connecting the reciprocating engine with the turbine for directing exhaust steam from the former to the latter, $d^1$ designates, generally, a valve interposed in the conduit $d$ and inclusive of a valve $d^2$ movable between two positions in one of which, as shown in Fig. 1, it permits flow of steam from the engine $a$ to the turbine $b$, and in the other of which, as shown in Fig. 2, it diverts steam from the turbine $b$ either to the atmosphere or, for example, to a condenser, $p$ designates an oil pump such, for example, as is generally employed for the pressure lubrication of the bearings of an engine, $s$ designates a centrifugal governor actuated by the reciprocating engine, $r$ designates a valve controlled by said governor, and $e$ designates a combined automatic and manually operable oil flow control valve.

The fluid coupling $c$ may be of any suitable known type such that when fluid such as oil is supplied thereto it serves to connect the turbine $b$ with the shaft $a^1$ for driving the latter, and, when fluid is exhausted there-from to disconnect the turbine from said shaft. To this end said coupling in its general organization consists as shown of a fluid containing casing inclusive of an annulus $c^1$ comprising a pair of spaced disk-like members $c^3$ connected together and loosely mounted on a shaft $c^2$ and provided with pockets to receive oil or other fluid, and a third disk-like member fixed to said shaft and provided with pockets for cooperation with the pockets of the pair of disk-like members first mentioned. When oil or other fluid is supplied between the disk-like members and fills the pockets thereof the members are operatively connected together so that rotation of the annulus $c^1$ produces rotation of the shaft $c^2$. On the other hand, by emptying the coupling the disk-like members are operatively disconnected from each other whereby the annulus $c^1$ may be rotated without producing rotation of the shaft $c^2$. Fixed to the disk-like members of the annulus $c^1$ are gear wheels $c^4$, $c^4$, respectively, which are in mesh with pinions $c^5$ fixed to the turbine shaft, while fixed to the coupling shaft $c^2$ are pinions $c^6$ which are disposed in mesh with gear wheels $c^7$ fixed to the shaft $a^1$. The shaft $c^2$ has a duct $c^8$ for the supply of fluid to the casing comprised by the parts $c^1$ and $c^3$ and the part $c^1$ of said casing has an oil outlet opening $c^9$ adapted to be opened or closed by a valve $c^{10}$ in the form of reciprocal pin. A casing $c^{11}$ encloses the coupling $c$ and on said casing is mounted a cylinder $f$ having a piston $f^1$ therein from which extends a piston rod $f^2$. The valve pin $c^{10}$ is connected with a ring $c^{12}$ and the piston rod $f^2$ is inclusive of a forked end engaging said ring whereby the piston $f^1$ is effective to actuate the valve pin to open or close the opening $c^9$ in any rotated position of the fluid coupling.

The steam valve $d^1$ likewise may be of any suitable type such that it is adapted to be operated by fluid pressure to a position to direct steam to the turbine $b$, and is maintained normally; i. e., when not subjected to the influence of fluid pressure, in a position to divert steam from the turbine. To this end said valve may be inclusive of a cylinder $d^3$ having a piston $d^4$ therein connected by a piston rod $d^5$ with the valve $d^2$ and a coil spring $d^6$ may be provided to constantly urge the valve $d^2$ to a position to cut off the supply of steam to the turbine.

The valve $r$ consists essentially of a casing provided with a pair of ports $r^1$ and $r^2$ spaced longitudinally thereof and having reciprocal therein a double piston $r^3$ which in one position denies communication between the ports $r^1$ and $r^2$ and in another position establishes communication between the ports $r^1$ and $r^2$. This piston $r^3$ is adapted to be actuated to its first mentioned position, shown in Fig. 1, by the governor $s$ when the reciprocating engine attains a predetermined speed and is adapted to be moved to its second mentioned position, shown in Fig. 2, by a spring $r^4$ when the reciprocating engine is at rest or is operating at a relatively slow rate of speed.

The valve $e$ consists of a casing inclusive of two separate piston chambers $e^1$ and $e^2$, in the former of which is a piston $e^3$ and in the latter of which are two double or spaced pairs of pistons $e^4$ and $e^5$, respectively, all connected together by a common piston rod $e^6$ which projects beyond one end of the casing and is provided with a hand grip device $m$ for effecting manual manipulation of said pistons. At each end and at the center of the chamber $e^2$ is a port $e^7$ connected in any suitable manner with an oil collection tank (not shown), while intermediate its ends said chamber $e^2$ is provided with a pair of longitudinally spaced ports $e^8$ and $e^9$ under the control of the double pistons $e^4$, and a series of three longitudinally spaced ports $e^{10}$, $e^{11}$ and $e^{12}$ under the control of the double pistons $e^5$. The chamber $e^1$ has a port $e^{13}$ located at its inner end.

A pipe $q$ connects the pump $p$ with the port $r^1$ of the valve $r$ and from said pipe $q$ a branch pipe $v$ leads to the various bearings to be lubricated. Also from said pipe $q$ a pipe $h$ leads to the ports $e^8$ and $e^{11}$ of the valve $e$. From the port $r^2$ of the valve $r$ a pipe $t$ leads to the port $e^{13}$ of the cylinder chamber $e^1$. From the port $e^9$ a pipe $i$ leads to the duct $c^8$ in the shaft $c^2$ of the fluid coupling $c$, while branching off from this pipe $i$ is a pipe $k$ which leads to the cylinder $d^3$ at the side of the piston $d^4$ therein so that when fluid is supplied through said pipe to said cylinder the piston $d^2$ will be moved to the position shown in Fig. 1 to direct steam to the turbine $b$. From the port $e^{10}$ a pipe $o$ leads to one end of the cylinder $f$, and from the port $e^{12}$ a pipe $n$ leads to the other end of the cylinder $f$.

When the engine $a$ is at rest the valve pistons $r^3$, $d^2$, $e^3$, $e^4$, $e^5$, $f^1$ and $c^{10}$ occupy the positions shown in Fig. 2. Consequently, the turbine is disconnected from the shaft $a^1$ and flow of steam to the turbine $b$ through the pipe $d$ is prevented. Assuming now that the engine $a$ is started in an "ahead" direction and is run slowly, it is apparent that oil will be supplied through the pipe $q$, ports $r^1$ and $r^2$ of the valve $r$ and pipe $t$ to the valve chamber $e^1$ and through the pipe $h$ to the valve chamber $e^2$ and from said chamber through the pipe $o$ to the inner end of the cylinder $f$. If now the engine is brought up to a speed to actuate the governor $s$ to in turn actuate the pistons $r^3$ of the valve $r$, said pistons are moved to the position shown in Fig. 1 and communication between the pipes $q$ and $t$ is cut off. At the same time communication is established between the port $r^2$ and a port $r^5$ which may lead to the oil tank. Consequently, the inner end of the piston $e^3$ of the valve $e$ is relieved of any oil pressure and the pistons $e^3$, $e^4$ and $e^5$ are free to be moved manually by means of the hand grip device $m$ to the position shown in Fig. 1. When this is done the pistons $e^4$ place the pipes $h$ and $i$ in communication with one another and the pistons $e^5$ place the port $e^{10}$ in communication with the middle port $e^7$ leading to the oil tank and establish communication between the ports $e^{11}$ and $e^{12}$. Oil then flows from the pump through the pipes $h$ and $n$ to the outer end of the cylinder $f$, thereby moving the piston $f^1$ inward to actuate the valve pin $c^{10}$ to close the outlet opening $c^9$. Since now oil cannot escape from the fluid coupling $c$ the latter becomes filled with oil through the pipes $h$ and $i$ and the turbine $b$ as a consequence is connected in driving relation with the propeller shaft $a^1$ through the fluid coupling. When the fluid coupling becomes filled with a consequent building up of pressure in the pipe $i$, oil then flows through the pipe $k$ to the cylinder $d^3$ and actuates the piston $d^4$ to move the valve $d^2$ to direct exhaust steam from the engine $a$ to the turbine $b$. The turbine thereupon begins to operate and to add its power to that of the reciprocating engine for developing torque in the shaft $a^1$.

When the speed of the engine $a$ is reduced preparatory to reversing same, and during relatively slow speed reverse or "astern" operation thereof, the governor is ineffective to maintain the valve $r^3$ in the position shown in Fig. 1 and as a consequence said valve is moved by the spring $r^4$ to the position shown in Fig. 2 in which position of said valve communication is established between the pipes $q$ and $t$. Oil then flows into the chamber $e^1$ and moves the piston $e^3$ to the position shown in Fig. 2 whereupon the port $e^8$ is blanked, the port $e^9$ is placed in communication with the oil tank through the middle port $e^7$, the ports $e^{10}$, $e^{11}$ are placed in communication with one another, and the port $e^{12}$ is placed in communication with the oil tank through the related end port $e^7$. Consequently, supply of oil to the pipes $i$ and $k$ is denied and the spring $d^5$ then becomes effective to move the valve $d^2$ to the position shown in Fig. 2 to divert steam from the turbine. At the same time oil is supplied through the pipe $h$, ports $e^{11}$ and $e^{10}$ and pipe $o$ to the inner end of the cylinder $f$ and the piston $f^1$ is moved to actuate the valve $c^{10}$ to uncover the opening $c^9$, thereby permitting oil to escape from the fluid coupling to disconnect the turbine from the propeller shaft. Thus, upon slowing down of the engine $a$ the turbine is immediately disconnected from the propeller shaft and a subsequent untimely coupling of the turbine with the propeller shaft is rendered impossible because of the pressure of oil against the piston $e^3$ holding the pistons $e^4$ and $e^5$ in the position of Fig. 2. When the parts are in the position shown in Fig. 1 it is, of course, possible by manipulation of the handle $m$ to actuate the valves $e^4$, $e^5$ to the position shown in Fig. 2 with the results heretofore set forth.

I claim:

1. In combination, a shaft to be driven, a reciprocating engine connected with said shaft, a turbine, a releasable fluid coupling connection between said turbine and said shaft, and means operable in response to the speed of the reciprocating engine being reduced to a predetermined low rate to effect release of said coupling.

2. In combination, a shaft to be driven, a reciprocating steam engine connected with said shaft, a steam turbine, a releasable fluid coupling connection between said turbine and said shaft, a valve for controlling the supply of steam to said turbine, and means operable in response to the speed of the reciprocating engine being reduced to a predetermined low rate to actuate said valve to divert steam from said turbine and to effect release of said coupling.

3. In combination, a shaft to be driven, a reciprocating steam engine connected with said shaft, a steam turbine releasably connected with said shaft, a valve for controlling the supply of steam to said turbine, and means operable in response to the speed of the reciprocating engine being reduced to a predetermined low rate to actuate said valve to divert steam from said turbine.

4. In combination, a shaft to be driven, a reciprocating steam engine connected with said shaft, a steam turbine, a releasable connection between said turbine and said shaft, a valve for controlling the supply of steam to said turbine, and means operable in response to the speed of the reciprocating engine being reduced to a predetermined low rate to actuate said valve to divert steam from said turbine and thereafter to effect release of said coupling.

5. In combination, a shaft to be driven, a reciprocating steam engine connected with said shaft, a steam turbine, a fluid coupling device between said turbine and said shaft, a source of fluid supply for said coupling, a manually operable valve, and another valve operable upon presetting of said manually operable valve and in response to the speed of the reciprocating engine being raised to a predetermined high rate to direct a flow of fluid to said fluid coupling to effect a driving connection through said coupling between the turbine and said shaft.

6. In combination, a shaft to be driven, a reciprocating engine connected with said shaft, a turbine, a fluid coupling device between said turbine and said shaft, a fluid operated valve for controlling the escape of fluid from said coupling, a source of fluid supply, and a second valve manually operable to a position to direct a flow of fluid to said coupling and operable in response to the speed of the reciprocating engine being reduced to a predetermined low rate to cut off the supply of fluid to said coupling and to direct a flow of fluid to open said first mentioned valve.

7. In combination, a shaft to be driven, a reciprocating steam engine connected with said shaft, a steam turbine, a fluid coupling device between said turbine and said shaft, a fluid operated valve for controlling the escape of the fluid from said coupling, a valve for controlling the supply of steam to said turbine, means constantly urging said steam control valve to a position to cut off the supply of steam to said turbine, fluid operated means for moving said steam control valve to a position to direct steam to said turbine, a source of fluid supply, an automatic fluid control valve responsive to changes in the speed of the reciprocating engine, and a second fluid control valve under the control of said first mentioned fluid control valve manually operable to a position to direct a flow of fluid from said source of supply to said fluid coupling and to said steam control valve to actuate the latter to direct steam to said turbine and operable under the control of said first mentioned fluid control valve and in response to a predetermined change in the speed of the reciprocating engine to cut off the supply of fluid to said steam control valve and said fluid coupling and to direct a flow of fluid from said source of supply to open the fluid escape valve of the fluid coupling.

In testimony whereof I have affixed my signature.

HANS WACH.